(12) United States Patent
Leon et al.

(10) Patent No.: US 7,128,972 B2
(45) Date of Patent: Oct. 31, 2006

(54) WRINKLED POLYESTER PARTICLES

(76) Inventors: Jeffrey W. Leon, Eastman Kodak Company, 343 State St., Rochester, NY (US) 14650; Christine J. Landry-Coltrain, Eastman Kodak Company, 343 State St., Rochester, NY (US) 14650

( * ) Notice: Subject to any disclaimer, the term of this patent is extended or adjusted under 35 U.S.C. 154(b) by 420 days.

(21) Appl. No.: 10/208,344

(22) Filed: Jul. 30, 2002

(65) Prior Publication Data
US 2004/0023027 A1 Feb. 5, 2004

(51) Int. Cl.
*B32B 5/16* (2006.01)
(52) U.S. Cl. ................................ 428/402; 428/32.32
(58) Field of Classification Search ................. 528/80, 528/83, 86, 129; 428/152, 32.21, 32.36, 428/32.25, 32.27, 32.28, 32.37, 402
See application file for complete search history.

(56) References Cited

U.S. PATENT DOCUMENTS

| | | | |
|---|---|---|---|
| 4,968,577 A * | 11/1990 | Kohri et al. | 430/110.2 |
| 5,491,202 A * | 2/1996 | Umehara et al. | 525/438 |
| 5,559,202 A | 9/1996 | Yoshikawa | |
| 5,604,076 A * | 2/1997 | Patel et al. | 430/137.14 |
| 5,698,292 A * | 12/1997 | Richart et al. | 428/152 |
| 6,114,020 A * | 9/2000 | Misuda et al. | 428/32.35 |

FOREIGN PATENT DOCUMENTS

| | | |
|---|---|---|
| EP | 0 467 528 A2 * | 1/1992 |
| EP | 1 336 638 A1 | 8/2003 |
| WO | WO 92/16565 | 10/1992 |
| WO | WO 93/19099 | 9/1993 |

OTHER PUBLICATIONS

JP 06 313021 A—Japanese Abstract, Nov. 8, 1994.
Sumalee Tawonsree et al, Journal of Polymer Science: Part A: Polymer Chemistry, vol. 38, 2000, pp. 4038-4056.

* cited by examiner

*Primary Examiner*—Robert D. Harlan
(74) *Attorney, Agent, or Firm*—Lynne M. Blank

(57) ABSTRACT

The present invention comprises wrinkled polymer particle comprising a polyester-containing particle having a surface covered with at least one wrinkle comprising folds, ridges, crevices and channels. The present invention further comprises a method of forming wrinkled polyester-containing particles comprising preparing a mixture of an organic phase and an aqueous phase, said mixture comprising an unsaturated precursor polyester, a water immiscible organic solvent, at least one organic-soluble ethylenically unsaturated monomer, and initiator, subjecting said mixture to high energy emulsification, initiating crosslinking of said polyester after emulsification, and removing said water immiscible organic solvent to recover wrinkled polyester-containing particles.

48 Claims, 6 Drawing Sheets

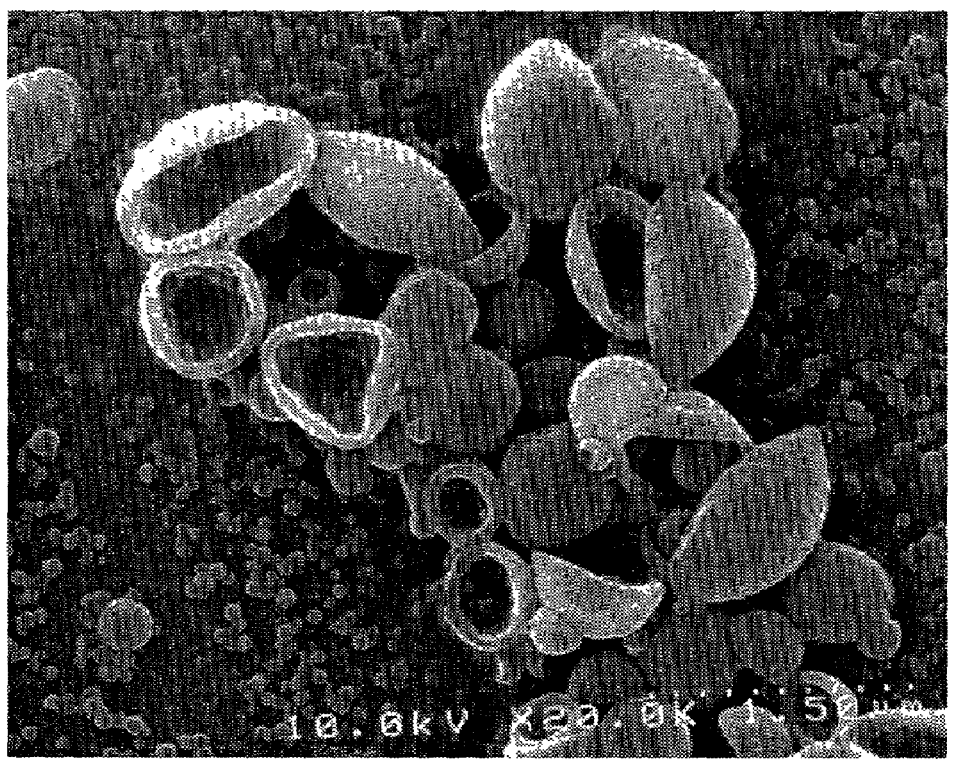
FIG. 2 ——— 1.50 μm
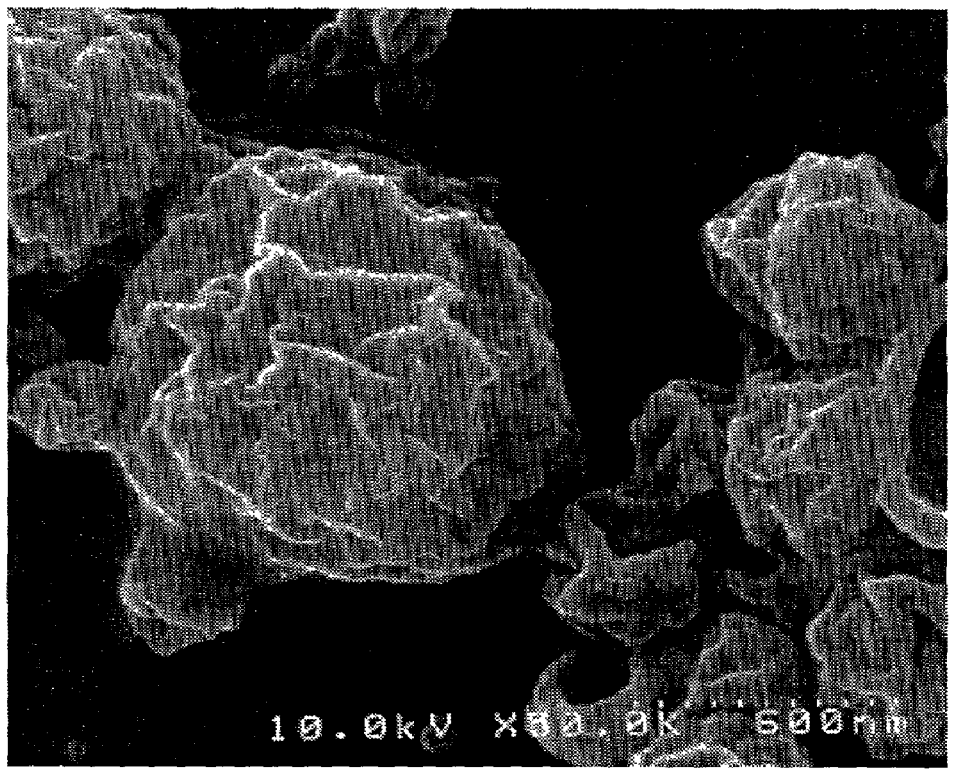
FIG. 3 ——— 600 nm

WRINKLED POLYESTER PARTICLES

CROSS REFERENCE TO RELATED APPLICATIONS

Reference is made to commonly assigned, U.S. patent applications: Ser. No. 10/208,220, now U.S. Pat. No. 6,753,051, by Landry-Coltrain et al., filed of even date herewith entitled "Ink Recording Element Utilizing Wrinkled Particles".

FIELD OF THE INVENTION

This invention relates to wrinkled polyester-containing particles. The invention further relates to a method of making wrinkled polyester-containing particles.

BACKGROUND OF THE INVENTION

There is interest in the development of specialized microparticles for use as adsorbents, chromatographic materials, cosmetic additives, matting agents, and permeable layers in multilayer imaging media. Irregularly shaped microparticles, wrinkled particles in particular, provide specific advantages of greater surface area and increased interstitial volume. This makes such particles particularly well suited for use in inkjet receiver media. For this application, there is additional interest in irregularly shaped particles of chemical compositions which lend inherent stability to guest dyes and colorants. It is also desirable that such particles have excellent colloidal stability in water and highly polar solvents.

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof An inkjet recording element typically comprises a support having on at least one surface thereof an ink-receiving or image-forming layer and includes those intended for reflection viewing, which have an opaque support, and those intended for viewing by transmitted light, which have a transparent support.

An inkjet recording element that simultaneously provides an almost instantaneous ink dry time and good image quality is desirable. However, given the wide range of ink compositions and ink volumes that a recording element needs to accommodate, these requirements of inkjet recording media are difficult to achieve simultaneously.

Inkjet recording elements are known that employ porous or nonporous single layer or multilayer coatings that act as suitable ink receiving layers on one or both sides of a porous or non-porous support. Recording elements that use non-porous coatings typically have good image quality and stability but exhibit poor ink dry time. Recording elements that use porous coatings typically contain colloidal particulates and have poorer image stability but exhibit superior dry times.

While certain types of wrinkled particles are known which could conceivably be used in image recording elements for use with inkjet printing, there are many unsolved problems in the art and many deficiencies in the known products which limit their commercial usefulness. A major challenge in the design of an image-recording layer comprising wrinkled particles is to be able to obtain coatings which dry rapidly and impart favorable fade characteristics to guest colorants. Inkjet prints, prepared by printing onto inkjet recording elements, are subject to environmental degradation. They are especially vulnerable to light fade and fade resulting from gaseous impurities in the air, such as ozone and nitrogen oxides. Highly swellable hydrophilic layers can take an undesirably long time to dry, slowing printing speed. Porous layers speed the absorption of the ink vehicle, but often suffer from insufficient gloss and severe dye fade.

Irregularly shaped microparticles are known in the art, but they are badly suited for specific imaging applications due to either their size or composition or their inherent difficulty in preparation. WO 92/16565 and 93/19099 report crosslinked, wrinkled particles comprised of ethylenically unsaturated carboxylic acid-containing monomers. These particles, however, are large in size (>75 micrometers) and thus are unsuitable for use in thin coatings. In addition, the monomeric composition is chemically aggressive and will hasten the fade of guest dyes and colorants, thus making these particles unsuitable for certain imaging applications. Finally, the liquid uptake of these materials is extremely large. The particles increase dramatically in size upon absorbing liquids. Thus, coatings comprised of such superabsorbants will lose wet cohesion due to the large dimensional changes of the particles upon absorption of liquids. Bowl-shaped, crosslinked vinyl microparticles are reported in U.S. Pat. No. 5,559,202. The chemical composition of these particles, however, does not afford stability advantages to adsorbed dyes and colorants, thus making these particles unsuitable for use in inkjet receiver media. Wrinkled and irregularly shaped particles comprising methacrylate monomers are disclosed in Journal of Polymer Science Part A: Polymer Chemistry, Vol. 38, p. 4038–4056 (2000). Similarly, the chemical composition of these particles, does not afford stability advantages to adsorbed dyes and colorants, thus making these particles unsuitable for use in inkjet receiver media.

There is a need to provide microparticles which are readily dispersible in water and highly polar solvents, show rapid fluid absorption when incorporated in inkjet receiver media, and which are comprised of materials which lend inherent stability to guest colorants.

SUMMARY OF THE INVENTION

The present invention comprises a wrinkled polymer particle comprising a polyester-containing particle having a surface covered with at least one wrinkle comprising folds, ridges, crevices, and channels. Also disclosed is a method of forming wrinkled polyester-containing particles comprising preparing a mixture of an organic phase and an aqueous phase, said mixture comprising an unsaturated precursor polyester, a water immiscible organic solvent, at least one organic-soluble ethylenically unsaturated monomer, and initiator, subjecting said mixture to high energy emulsification, initiating crosslinking of said polyester after emulsification, and removing said water immiscible organic solvent to recover wrinkled polyester-containing particles.

Using the invention, a recording element is obtained which will provide improved ink uptake speed, high surface gloss and, when printed upon, has an excellent image quality. The method of the invention provides advantages with respect to the ability to use polyesters of an extremely broad compositional latitude with no restrictions due to glass transition temperature. In addition, this method offers, as an advantage, relatively simple process control and is ideally suited for high volume production. The colloidal stability of particles prepared by this method is excellent and a wide variety of irregular shapes can be attained. The wrinkled, polyester-based particles or beads made by this method are useful as adsorbents, opacifying additives for coatings, matting and texturizing agents, and fillers.

BRIEF DESCRIPTION OF THE DRAWINGS

FIG. 2. Scanning electron micrograph of Particle 2.
FIG. 3. Scanning electron micrograph of Particle 3.

DETAILED DESCRIPTION OF THE INVENTION

The wrinkled polyester-containing particles of this invention comprise the hybrid copolymerization product of an unsaturated precursor polyester and one or more monomers, which contain ethylenic unsaturation. A precursor polyester is a polyester containing unsaturated groups, which is used in turn to make wrinkled polyester particles.

Figure 1:
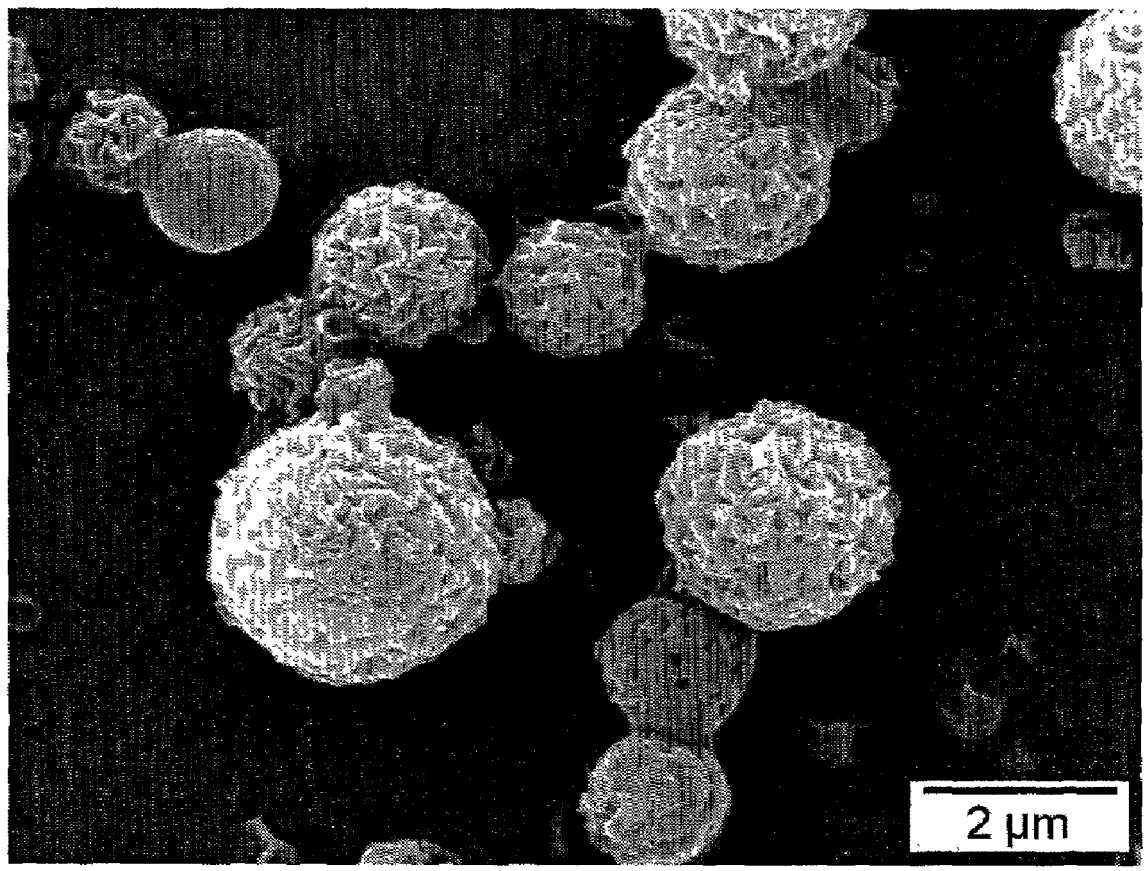
FIG. 1. Scanning electron micrograph of Particle 1.
Figure 4:
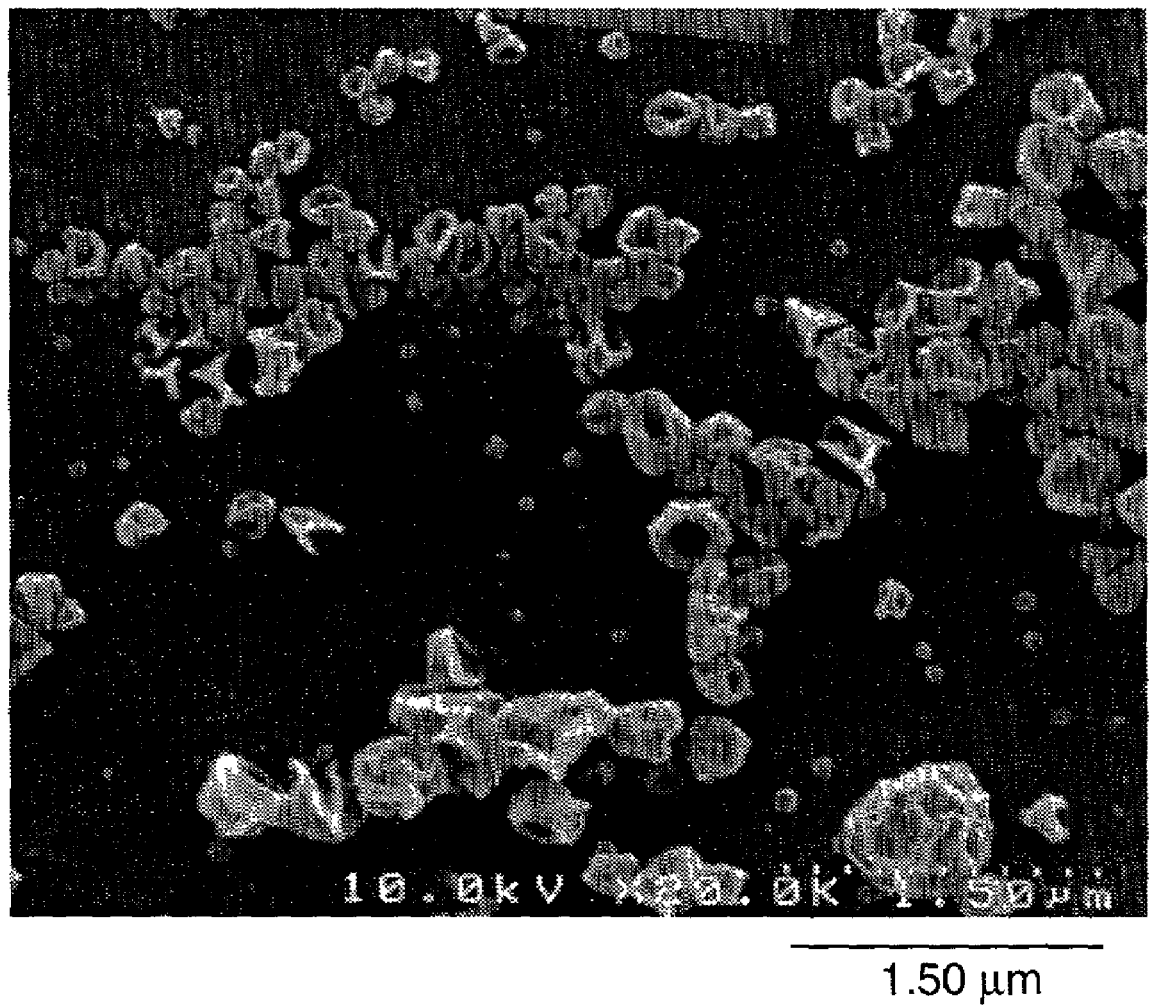
FIG. 4. Scanning electron micrograph of Particle 4.
Figure 5:
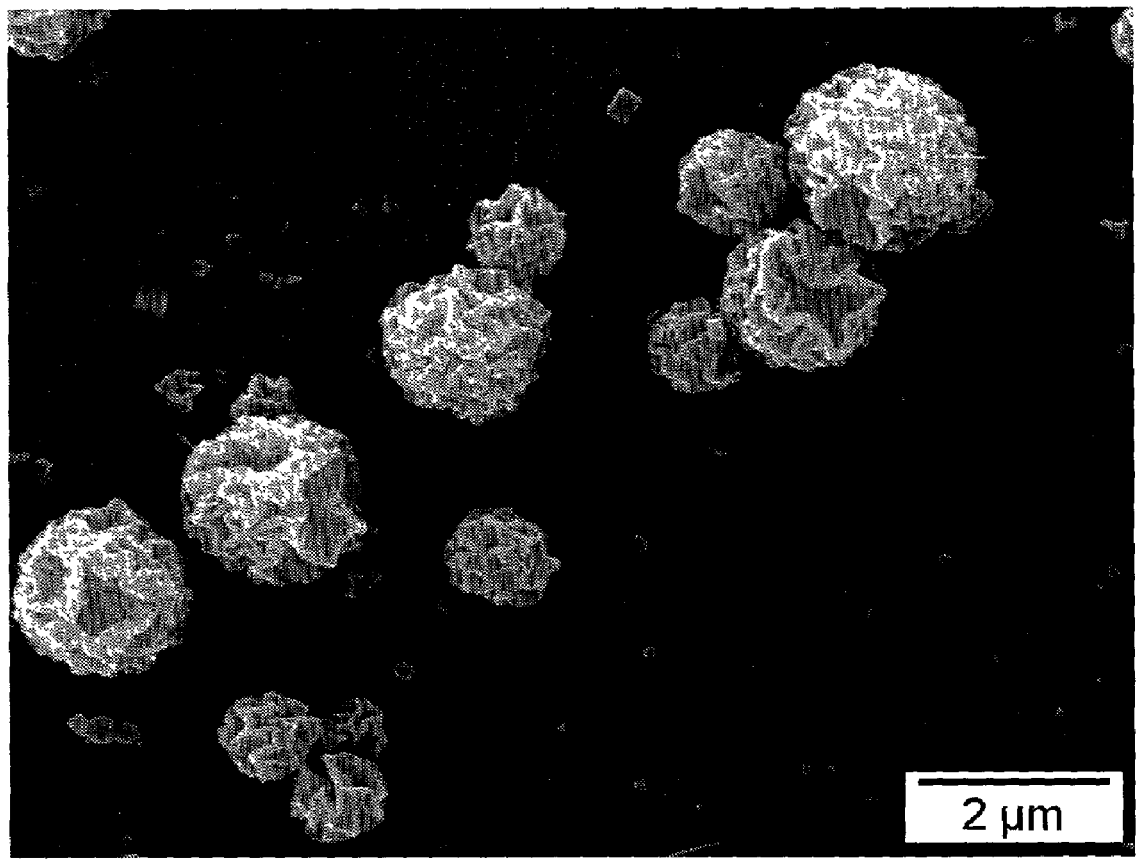
FIG. 5. Scanning electron micrograph of Particle 5.
Figure 6:
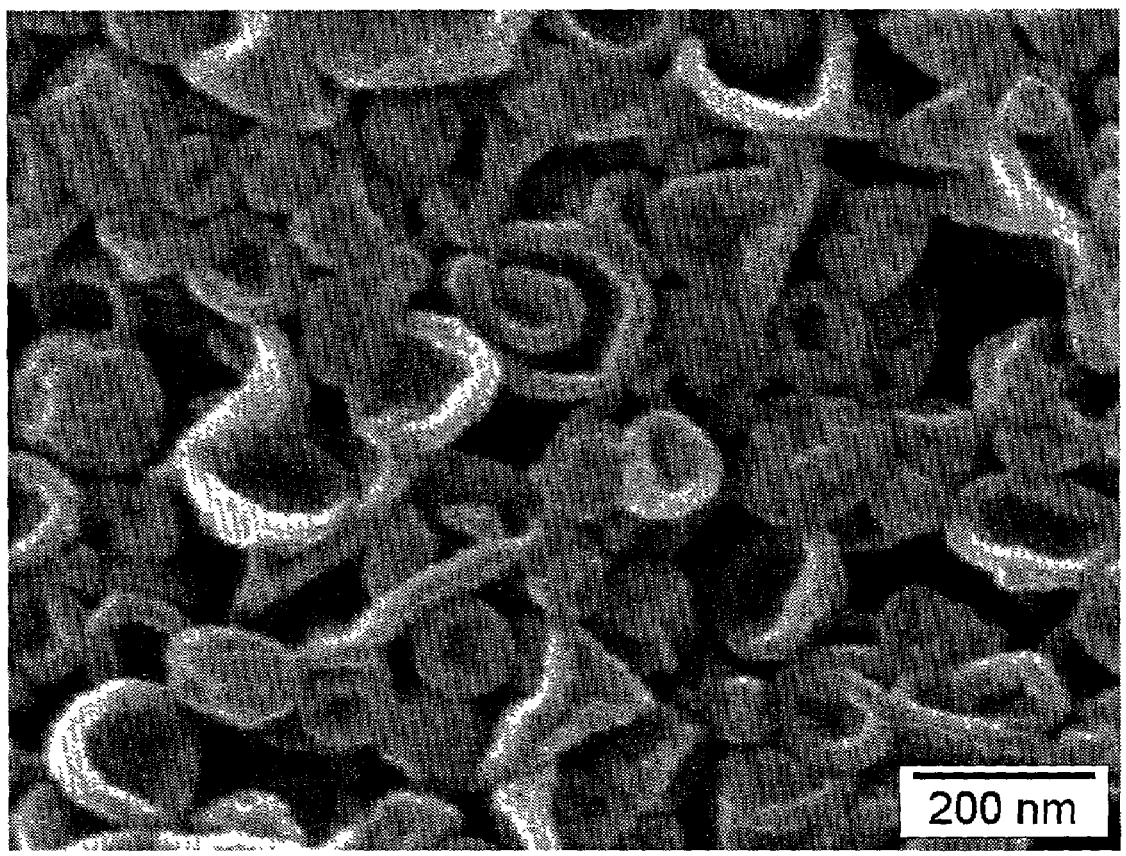
FIG. 6. Scanning electron micrograph of Particle 6.
Figure 7:
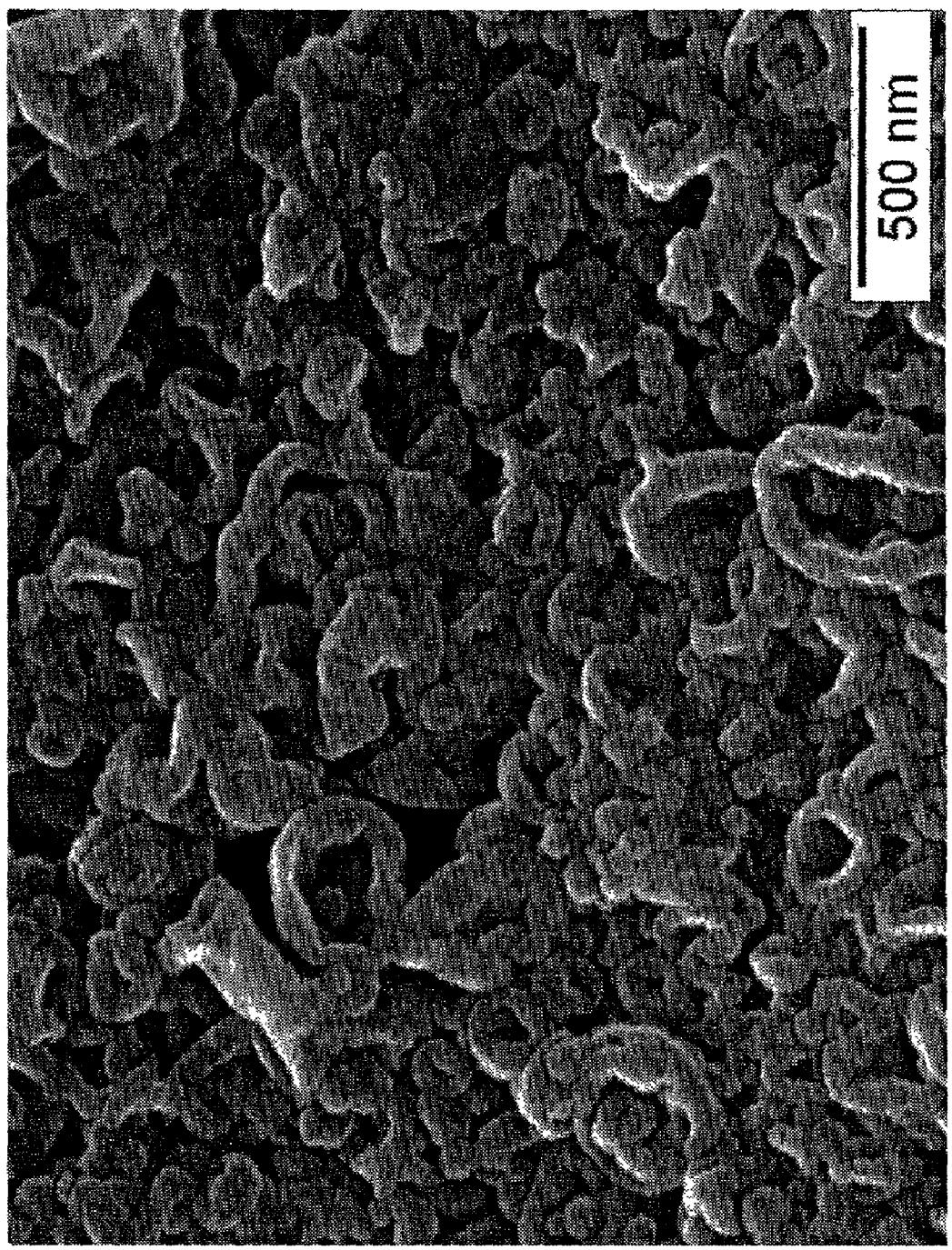
FIG. 7. Scanning electron micrograph of Particle 7.

The wrinkled polyester particles of this invention comprise wrinkled polyester particles having a mean diameter of between 0.05 and 50 micrometers. A mean diameter less than 10 micrometers is preferred. More preferably, the wrinkled polyester particles have a mean diameter range between 0.1 and 5.0 micrometers, and most preferably, that the wrinkled polyester particles have a mean diameter range between 0.1 and 2.0 micrometers. The diameter of the particles can be measured by any method known in the art. One such method is laser light scattering of dilute dispersions of the particles, using a commercially available instrument such as the Horiba LA-920, manufactured by Horiba LTD. The wrinkled polyester-containing particles will have a surface with at least one wrinkle. The wrinkle may comprise folds, ridges, crevices, channels or combinations thereof. The mean distance between the crests of the folds, ridges, crevices or channels will vary from 0.02 to 2 micrometers. Preferably, the mean distance will be between 0.04 and 0.4 micrometers. These "wrinkled" particles are distinct from "porous" particles in that the folds, ridges, crevices or channels which are present on the surface of the particle, commonly also referred to as a bead, and do not form continuous pathways through the particle's interior. These particles may have any shape, including spherical or bowl-shapes. In the case that the polyester-containing particle has only one wrinkle, then the particle can be said to be "bowl-shaped." Examples of the wrinkled particles of the present invention are illustrated by FIG. 1–7.

The wrinkled polyester-containing particles of this invention are readily dispersible in water, in water-miscible organic solvents, and in combinations thereof They may be stored as dispersions or the solvents can be removed to yield a dry material, which can be readily redispersed. The wrinkled polyester-containing particles are stabilized by surfactants, colloidal inorganics, protective colloids, or combinations thereof, which are reversibly adsorbed, affixed or chemically bound to the surface. Alternately, the particles may be stabilized by functionalities, which are covalently bound within the monomeric and polymeric components, which are reacted to form the particles.

In a preferred embodiment, the wrinkled polyester particles will contain ionic groups. The ionic groups may be anionic, such as carboxylate, sulfonate, sulfate, or thiosulfate, or cationic, such as ammonium, phosphonium, or sulfonium. The ionic groups will preferably be covalently bound to the particle or bead and will be present in such quantity as to give an ionic group equivalent weight of between 1,000 and 500,000 grams of particle per mole of ionic unit. Preferably, the ionic group equivalent weight of between 2,400 and 50,000 grams of particle per mole of ionic unit. These ionic units can be introduced into the particle by being present on the particle's parent components (monomers or precursor polyester) or they can be introduced to the particle by chemical modification of the particle after the particle has been synthesized. As an example of the former case, if the precursor polyester contains a sulfonated repeating unit (such as sulfoisophthalate), then this unit will be present in the particle. As an example of the latter case, if chloromethyl styrene is one of the monomers used in the preparation of the particle, then reaction of the particle with a tertiary amine will yield a particle functionalized with quaternary ammonium ions.

The precursor polyesters which may be used to form the wrinkled polyester particles of this invention are branched or unbranched, contain chemical unsaturation, and are either soluble in water-immiscible organic solvents or in water. Optionally, the precursor polyester may be self-emulsifying in water or amphiphilic or surfactant-like in character. The precursor polyesters may have any glass transition temperature, provided it fulfills the solubility requirements. Preferably, the number average molecular weight (Mn) is between 1,000 and 30,000 gm/mole.

As is well known in the art, polyesters are condensation products of polybasic acids or of corresponding acid equivalent derivatives such as esters, anhydrides or acid chlorides and polyhydric alcohols. It will be known that whenever "diacids" or "polyacids" are referred to in this document, that corresponding acid equivalent derivatives such as esters, anhydrides or acid chlorides are also included by reference. Polymerizable unsaturation may be introduced into the molecule by the selection of a polybasic acid or polyhydric alcohol, which contains $\alpha,\beta$-ethylenic unsaturation. For example, a polyhydric alcohol, which contains pendant unsaturation, is glycerol monomethaclylate. In most cases, however, the unsaturation will be contained within the polybasic acid unit. Optionally, one or more additional polyacids common in the art of polycondensation may be used in addition to the unsaturated polyacid. These ethylenically unsaturated polyacids include, but are not necessarily limited to maleic, fumaric, itaconic, phenylenediacrylic, citraconic and mesaconic acid. Other, additional polyacids which do not contain chemical unsaturation and can be used in polyesters are described in WO 01/00703 and are incorporated herein by reference. These diacids can include, but are not necessarily limited to malonic, succinic, glutaric, adipic, pimelic, azelaic, and sebacic acids, phthalic, isophthalic, terephthalic, tetrachlorophthalic, tetrahydrophthalic, trimellitic, trimesic, isomers of naphthalenedicarboxylic acid, chlorendic acid, trimellitic acid, trimesic acid, and pyromellitic acid.

Ethylenically unsaturated groups can also be introduced into the precursor polyester by synthetic modification. For example, a polyester with a high alcohol number can be reacted with an anhydride or acid chloride of acrylic acid or methacrylic acid in order to introduce ethylenically unsaturated units.

Precursor polyesters that are suitable for this invention can furthermore be comprised of any of a wide variety of polyhydric alcohols, which are well known in the art of polycondensation and may be aliphatic, alicyclic, or aralkyl. A description of suitable polyhydric alcohols is given in WO 01/00703 and is incorporated herein by reference. These alcohols can include, but are not necessarily limited to ethylene glycol, 1,3-propylene glycol, 1,6-hexanediol, 1,10decanediol, 1,4-cyclohexanedimethanol, 1,4-cyclohexanediol, hydroquinone bis (hydroxyethyl) ether, diethylene glycol, neopentyl glycol, bisphenols such as bisphenol A, ethylene oxide and propylene oxide adducts of bisphenol A, pentaerythritol, trimethylolpropane, and polyester polyols, such as that obtained by the ring-opening polymerization of $\epsilon$-caprolactone. Additionally, A-B type polycondensation monomers which contain both hydroxyl and acid derivative functions can be used as well as monoacids and monoalcohols.

In one embodiment of this invention, precursor polyesters, which are water-soluble, surfactant-like, or self-emulsifying and additionally contain chemical unsaturation may be utilized. Water-soluble, surfactant-like, and self-emulsifying polyesters are well known in the art and will contain one or more type of hydrophilic chemical group, functionality, or monomer, such as carboxylate, ammonium, quaternary ammonium, sulfonate, sulfate, sulfonium, phosphonium, iminosulfonyl, or polymeric or oligomeric oxyethylene segments. Precursor polyesters used to form the wrinkled polyester particles useful in this invention will additionally contain one or more polyacid or polyol monomers, which contain ethylenic unsaturation as detailed above. The water-soluble, surfactant-like, and self-emulsifying precursor polyesters used to form the wrinkled polyester particles of this invention may contain one or more diacid or diol components, which can induce hydrophilic character or water-solubility. The most common hydrophilic diol used for this purpose is polyethylene glycol. Additionally, tertiary amine units substituted with two or three hydroxyalkyl groups can be incorporated within a precursor polyester and rendered ionic either by quaternization with an alkylating agent or by neutralization with an acid. A commonly used class of diacid components used to impart hydrophilicity to polyesters includes compounds containing sulfonate or sulfonimide salts. Some suitable sulfonated diacids are described in U.S. Pat. Nos. 4,973,656 and 5,218,042 and are incorporated herein by reference. Examples of such diacids are 5-sodiosulfoisophthalic acid, 2-sodiosulfobutanoic acid, and di-Me sodioiminobis(sulfonyl-m-benzoate). Another common strategy for the hydrophilization of polyesters involves the neutralization of the acid end groups of polyester with a relatively high acid number. Preferably, the acid number is at least 10 mg KOH/g polymer. Most preferably the acid number is greater than 25 mg KOH/g polymer. The neutralization agent is usually an alkali metal hydroxide or an amine. Polyesters containing ethylenic unsaturation and neutralized acid end groups can also be used in this invention. Preferably, the unsaturated precursor polyester will contain an ionic group equivalent molecular weight of between 200 and 20,000 grams of polymer per mole of ionic unit. Most preferably, the unsaturated precursor polyester will contain an ionic group equivalent molecular weight of between 600 and 6000 grams of polymer per mole of ionic unit.

The ethylenically unsaturated monomers useful for crosslinking the precursor polyesters in this invention are monomers commonly used in the art of addition polymerization. Although wrinkled particles can often be comprised of a polyester in combination with one monomer, either unifunctional or polyfunctional, a preferred embodiment will comprise a combination of at least one unifunctional monomer and at least one polyfunctional monomer in which the unifunctional monomers comprises 50–99% of the combination. Preferably, the unifunctional monomers will comprise 60–90% of the combination. Most preferably, the unifunctional monomers will complise 75–90% of the combination. In a preferred embodiment, at least one of the monomers is unifunctional and at least one is polyfunctional.

The precursor polyester will be present in the particles in a weight percent of 0.5–75%. Preferably, the weight percent of polyester in the particles will be 1–50%. Most preferably, the weight percent will be 1–33%.

Unifunctional monomers useful in this invention include, but are not necessarily limited to, methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, $\alpha$-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ethers, such as butyl vinyl ether, allyl alcohol and its ethers and esters, and unsaturated ketones and aldehydes such as acrolein and methyl vinyl ketone and acrylonitrile. Styrenic and methacrylic acid esters are most preferred, due to their availability and effectiveness in the present invention.

Polyfunctional monomers which are useful in this invention include, but are not necessarily limited to divinylbenzene and related isomers, diol dimethacrylates, such as ethylene glycol dimethyacrylate, divinyl ethers such as cyclohexanedimethanol divinyl ether and ethylene glycol divinyl ether, divinyl esters such as divinyl adipate, and multifunctional acrylates and methacrylates such as trimethylolpropane tri(meth)acrylate.

In addition, small amounts (typically less than 10% of the total weight of the polymerizable solids) of one or more water-soluble ethylenically unsaturated monomer can be used. Such monomers include but are not necessarily limited to styrenics, acrylates, and methacrylates substituted with highly polar groups, unsaturated carbon and heteroatom acids such as acrylic acid, methacrylic acid, fumaric acid, maleic acid, itaconic acid, vinylsulfonic acid, vinylphosphonic acid, and their salts, vinylcarbazole, vinylimidazole, vinylpyrrolidone, and vinylpyiidines. Monomers (unifunctional and polyfunctional) which are preferred for this invention are styrenics, vinyl ethers, and vinyl esters. Especially preferred monomers are styrenics such as styrene and divinylbenzene.

The method described herein for preparing wrinkled polyester particle or beads comprises crosslinking at least one unsaturated polyester with at least one ethylenically unsaturated monomer within an oil-in-water emulsion in the presence of a water-immiscible organic solvent. The crosslinking reaction is a radical-initiated polymerization of an ethylenically unsaturated monomer, which readily copolymerizes with the unsaturated units in the polyester. The polyester can be organic-soluble, in which case an added emulsifying agent is necessary. In another embodiment of this method, the polyester can be water-soluble, water-dispersible, or amphiphilic in character, in which case the polyester acts as the emulsifying species and an added emulsifying agent is merely optional. The water-immiscible organic solvent is removed by any means, including boiling, evaporation, solvent extraction, vacuum drying, or dialysis to yield a dispersion of porous, crosslinked, polyester-containing particles. In yet another method, bowl-shaped wrinkled polyester-containing particles may be formed by preparing a mixture of an organic phase and an aqueous phase, said mixture comprising an unsaturated precursor polyester, at least one organic-soluble ethylenically unsaturated monomer, and initiator, subjecting said mixture to high energy emulsification, initiating crosslinking of said polyester after emulsification, and removing said water immiscible organic solvent to recover wrinkled polyester-containing particles.

These methods of the invention can be easily scaled up and can be applied to a very wide variety of unsaturated polyesters, which can be water-soluble, water-dispersible, or oil-soluble. The polyesters which can be used are not restricted by their glass transition temperature and a diversity of wrinkled particle morphologies can be afforded by this technique. This method comprises preparing a mixture of an organic phase and an aqueous phase comprising an unsaturated polyester, a water immiscible organic solvent, at least one organic-soluble monomer, an initiator, and optionally an added surfactant, emulsifier, cosurfactant, or stabilizer compound. The polyester and initiator may be present in the mixture in either the aqueous or organic phase. The mixture is subjected to high energy emulsification by any of a variety of methods including, but not limited to high shear mixing, sonication, homogenization and microfluidization and crosslinking is initiated by either heating or addition of one component of a multiple component redox initiation system. In the preferred embodiment, heating should be in the temperature range of between 30 and 100° C. and for a period of between 0.5 and 16 hours. The water immiscible organic solvent is then removed to afford an aqueous dispersion of the porous polyester particle or beads, which can then be isolated as a solid if desired.

The precursor polyesters and monomers, which are useful in this method, are described in preceding sections of this document. In the preferred embodiment of this method, the precursor polyester will comprise at least 20 mole percent unsaturated diacid units based on total diacid units and will be amphiphilic, self-emulsifying, or surfactant-like. Also in the preferred embodiment, the polyester will contain ionic groups which will be present in amounts sufficient to afford an ionic group equivalent molecular weight of between 600 and 6000 grams of polymer per mole of ionic unit. Preferably the precursor polyester will comprise sulfonated repeating units.

Also in the preferred embodiment of this invention the monomers used will include a combination of at least one unifunctional monomer and at least one polyfunctional monomer in which the unifunctional monomers comprises 50–99% by weight of the combination. Preferably, the unifunctional monomers will comprise 60–90% of the combination. Most preferably, the unifunctional monomers will comprise 75–90% of the combination. The precursor polyesters and the combined monomers will be present in the initial reaction mixture in a weight ratio (precursor polyesters: monomers) which may vary from 1:99 to 10:1. Preferably, the ratio will vary from 1:19 to 1:1. Most preferably, the ratio will vary from 1:10 to 1:2. If a water-soluble, water-dispersible, or amphiphilic polyester is used with relatively high ratios (>1:2) of polyester:monomers, particles with very highly irregular surfaces may be obtained, but large amounts of polyester will often remain unincorporated in the aqueous phase.

In this method, the total organic phase will comprise 2–90% of the total reaction volume. Preferably, it will comprise 5–50% of the reaction volume. Most preferably, it will comprise 15–35% of the total reaction volume.

Any of the common water-soluble or organic-soluble free radical polymerization initiators known in the art of addition polymerization can be used for this invention. These include, but are not restricted to azo compounds, such as 2,2'-azobis(4-methoxy-2,4-dimethylvaleronitrile), (1-phenylethyl)-azodiphenylmethane, 2-2'-azoisobutyronitrile (AIBN), 1,1'-azobis(1-cyclohexanedicarbonitrile), 4,4'-azobis(4-cyanopentanoic acid), and 2,2'-azobis(2-amidinopropane) dihydrochloride, organic peroxides, organic hydroperoxides, peresters, and peracids such as benzoyl peroxide, lauryl peroxide, capryl peroxide, acetyl peroxide, t-butyl hydroperoxide, t-butyl perbenzoate, cumyl hydroperoxide, peracetic acid, 2,5-dimethyl-2,5-di(peroxybenzoate), and p-chlorobenzoyl peroxide, persulfate salts such as potassium, sodium and ammonium persulfate, disulfides, tetrazenes, and redox initiator systems such as $H_2O_2/Fe^{2+}$, persulfate/bisulfite, oxalic acid/$Mn^{3+}$, thiourea/$Fe^{3+}$, and benzoyl perozide/dimethylaniline.

The organic solvents useful in the present invention include or are defined as water immiscible, carbon containing compounds, which are liquids at or below room temperature. A water-immiscible organic solvent is included in the organic phase of this invention. The sole criteria for the selection of this solvent is that it is water-immiscible, and does not quench the crosslinking reaction or undergo any other side reactions to an appreciable extent that it would interfere with the process or introduce any unintended byproducts or contaminants. It is desirable that the organic-soluble monomers and the organic soluble polyester are soluble in this solvent. It is not necessarily required, however that the product polyester particle or beads have a high compatibility with the solvent or can be readily swelled by the solvent. It is furthermore desirable, but not required, that the solvent have a boiling point sufficiently low as to be easily removed by evaporation under atmospheric or reduced pressure. Useful water-immiscible organic solvents of this invention include, but are not necessarily limited to toluene, benzene, acetate esters, such as ethyl acetate, propyl acetate, butyl acetate, carbon tetrachloride, chloroform, isopropyl ether, butyl ether, xylene and related isomers, hexane, heptane, octane, petroleum ethers, cyclohexanol, butanol, 1-dodecanol, cyclohexanone, chloroform, methylene chloride, 1-octanol, cyclohexanol, and 1,2-dichloroethane. Toluene, ethyl acetate, and propyl acetate are preferred. In certain variations of this method wherein the polyester has very limited solution compatibility with the monomer mixture, omission of the water-immiscible organic solvent may yield bowl-shaped particles.

Optionally, a small amount of a cosurfactant stabilizer, typically comprising 1–10% by weight of the organic phase, may be added to the organic phase of this invention. These hydrophobic compounds are known to prevent Ostwald ripening in certain types of emulsion and suspension polymerization. Excellent discussions of cosurfactants are given in *Emulsion Polymerization and Emulsion Polymers* by Peter A Lovell and Mohammed S. El-Aaser, (John Wiley and Sons: Chichester, 1997, pp. 700–721) and U.S. Pat. No. 5,858,634. The most common cosurfactants are hexadecane and hexadecanol. Other useful cosurfactants may also serve other roles, such as acting as monomers or initiators. An example of the former is lauryl methacrylate. An example of the latter is lauroyl peroxide.

If a polyester is used in this invention which is not soluble or dispersible in water, then an emulsifier must additionally be used, although an emulsifier can be used in tandem with a water-soluble or water-dispersible polyester. It is preferable that the emulsifier be present in the aqueous phase. Though a very large variety of emulsifiers are known in the art, most of these fit into the three basic categories of surfactants, colloidal inorganics, and protective colloids. There exist a tremendous number of known surfactants. Good reference sources for surfactants are the *Surfactant Handbook* (GPO: Washington, D.C., 1971) and *McCutcheon's Emulsifiers and Detergents* (Manufacturing Confectioner Publishing Company: Glen Rock, 1992). There are no general restrictions for the surfactants, which are useful in this invention. Useful surfactants can be anionic, cationic, zwitterionic, neutral, low molecular weight, macromolecular, synthetic, or extracted or derived from natural sources. Some examples include, but are not necessarily limited to: sodium dodecylsulfate, sodium dodecylbenzenesulfonate, sulfosuccinate esters, such as those sold under the AEROSOL® trade name, flourosurfactants, such as those sold under the ZONYL® and FLUORAD® trade names, ethoxylated alkylphenols, such as TRITON® X-100 and TRITON® X-705, ethoxylated alkylphenol sulfates, such as RHODAPEX® CO-436, phosphate ester surfactants such as GAFAC® RE-90, hexadecyltrimethylammonium bromide, polyoxyethylenated long-chain amines and their quaternized derivatives, ethoxylated silicones, alkanolamine condensates, polyethylene oxide-co-polypropylene oxide block copolymers, such as those sold under the PLURONIC® and TECTRONIC® trade names, hydrophobe-end capped oligoacrylamides, such as those described in U.S. Pat. Nos. 6,127,453; 6,391,537; and pending U.S. Ser. No. 10/118,725 filed Apr. 9, 2002 "Polymer Particle Stabilized By Dispersant/Surfactant and Method of Preparation", N-alkylbetaines, N-alkyl amine oxides, and fluorocarbon-poly(ethylene oxide) block surfactants, such as FLUORAD® FC-430.

Protective colloids useful in this invention include, but are not necessarily limited to: poly (ethylene oxide), hydroxyethyl cellulose, poly (vinyl alcohol), poly (vinyl pyrrolidone), polyacrylamides, polymethacrylamides, sulfonated polystyrenes, alginates, carboxy methyl cellulose, polymers and copolymers of dimethylaminoethylmethacrylate, water soluble complex resinous amine condensation products of ethylene oxide, urea and formaldehyde, polyethyleneimine, casein, gelatin, albumin, gluten and xanthan gum. Protective colloids are a class of emulsifiers, which are used in lieu of or in addition to a surfactant. They are typically dissolved or dispersed in the aqueous phase prior to the emulsification step.

Similarly, colloidal inorganic particles can be employed as emulsifiers as part of a limited coalescence process. Colloidal inorganic particles can be employed in lieu of or in addition to any other type of emulsifier listed, such as a surfactant or protective colloid. They are also dispersed in the aqueous phase. Limited coalescence techniques have been describe in numerous patents such as U.S. Pat. Nos. 4,833,060 and 4,965,131. A colloidal inorganic which is particularly useful in this invention is LUDOX® TM sold by Du Pont. Preferably, the emulsifier is selected from the group consisting of sulfosuccinate esters and their salts, tetraalkylammonium salts, alkylphenol ethoxylates, PEO-PPO block copolymers, poly(vinyl alcohol), poly(vinyl pyrrolidone), salts of long chain alkylsulfonates, sulfonated alkylated diphenyl ethers, naphthalenesulfonate salts, alkylbenzenesulfonate salts, hydrophobe end-capped acrylamide oligomers, and colloidal silica.

Additional additives, which can be incorporated into a formulation useful in this invention, include pigments, dyes, biocides, fungicides, electrolytes, buffers, UV-absorbers, antioxidants and chain transfer agents.

The respective amounts of the polyester and the ethylenically unsaturated monomers are chosen such that the weight ratio (polyester:monomers) is between 1:199 and 3:1. Preferably, this ratio is between 1:100 and 1:1 and most preferably this ratio is between 1:100 and 1:2. The amount of water-immiscible organic solvent is chosen in such an amount that it will comprise 5–95% of the organic phase by weight. Preferably, it will comprise 20–90% of the organic phase. Most preferably, it will comprise 40–90% of the organic phase. If bowl-shaped particles are desired, then no water-immiscible organic solvent need be used. The amount of cosurfactant stabilizer is chosen in such an amount that it will comprise 0–10% by weight of the organic phase. Preferably, it will comprise 0.5–5%. Most preferably, it will comprise 1–4% of the organic phase. The emulsifier is chosen in such an amount that the ratio of the weight of emulsifier to the sum of the weight of the polyester plus the ethylenically unsaturated monomers is between 0.20 and 0.0025. Preferably, the ratio is between 0.1 and 0.01. Most preferably, the ratio is between 0.02 and 0.07. If a water-soluble, water-dispersible, or surfactant-like polyester is used, then the bottom limits of these ratios are zero, i.e. no emulsifier need be employed. Water is added in such an amount that the total aqueous phase will comprises 20–95% of the total weight of the formulation. Preferably, the aqueous phase will comprise 40–80%. Most preferably, the aqueous phase will comprise 60–80%. The appropriate amounts of any additional addenda may be added. Depending on the requirements of the class of addenda, preferably less than 5% based on the total weight of the reaction will be additional addenda.

In the execution of this invention, all of the formulation components are dissolved or dispersed in the phase, either aqueous or organic, in which they are soluble or dispersible. The two phases are combined and are emulsified by either sonication or a high shear mixing method or a combination of methods used in succession. By high shear mixing, it is meant that sufficient shearing energy is provided by approximately a rate of shear or velocity gradient of $10^5 \text{min}^{-1}$ or greater, more preferably $10^6 \text{min}^{-1}$ or greater. By rate of shear is meant a value obtained by dividing an absolute value of a difference of speeds of two planes by a distance between said two planes. A high pressure homogenizer operated at 1400 psi provides a rate of shear approximately equal to $6 \times 10^6 \text{min}^{-1}$. High pressure homogenizers are preferred. The emulsification can be performed using methods and devices widely used in the art including, but not necessarily limited to, a high speed blade mixer, a chemical blender, a rotor stator device such as a Silverson mixer or high pressure homogenizer such as a Manton-Gaulin Homogenizer, a Sonolator, a probe sonicator, or a Microfluidizer®. A preferred emulsification device is the Model No. 110T Microfluidizer® produced by Microfluidics Manufacturing.

The emulsified polyester particle or bead formulation is preferably degassed by bubbling with an inert gas such as nitrogen or argon. The formulation is then brought to a temperature at which the polymerization initiator is known to be sufficiently active and held for a period of time sufficient to complete the crosslinking reaction. For example, using AIBN or potassium persulfate, 2–24 hours at 60–80° C. is usually sufficient. For the persulfate/bisulfite redox system, 2–24 hours at 25–40° C. is usually sufficient. Optionally, a room-temperature initiator system or one component of a two component redox initiator system can be added after the emulsification to initiate the crosslinking.

When the crosslinking reaction is completed, the water-immiscible organic solvent may be removed. This can be achieved by rotary evaporation, azeotropic evaporation, low pressure distillation (LPD), by boiling optionally under a stream of an inert gas such as nitrogen, or by filtering or sedimenting the particles followed by successive washes with a volatile, medium polarity solvent. Certain solvents, which form an azeotrope with water, such as toluene, can be easily removed by simple distillation. Another useful method for solvent removal is dialysis, diafiltration, or ultrafiltration using an intermediate polarity solvent with which both water and the organic solvent have solubility. Alcohols, such as methanol, ethanol, and isopropanol work well for this method. Alternately, the water-immiscible organic solvent can be removed by pouring the particle dispersion into a water-miscible organic solvent and the particles can be retrieved by filtration or sedimentation.

The product particle or beads, having excellent colloidal stability, can be stored as an aqueous dispersion or freeze dried to yield a solid powder whichwill easily redisperse in water.

The following examples are intended to further illustrate, but not to limit, the invention.

EXAMPLES

Synthesis of Precursor Polyester 1

TABLE 1

| Reagent # | Reagent | Amount (g) | mole | Mole % in polymer |
|---|---|---|---|---|
| 1 | 5-sulfoisophthalic acid, dimethyl ester, sodium salts. | 64.21 | 0.22 | 18.0 |
| 2 | Dimethyl isophthalate | 74.82 | 0.39 | 32.0 |
| 3 | Diethyl fumarate | 103.65 | 0.60 | 50.0 |
| 4 | Diethylene glycol | 72.84 | 0.69 | 28.5 |
| 5 | 1,4-cyclohexanedimethanol | 74.67 | 0.52 | 21.5 |
| 6 | Sodium acetate | 1.62 | $1.97 \times 10^{-2}$ | — |
| 7 | Dibutyltin oxide | 0.19 | $7.63 \times 10^{-4}$ | — |

Reagents 1 and 4, 6, and 7 were combined in a 500 ml 3-neck flask equipped with a stainless steel stirring rod, nitrogen inlet, and an arm leading to a dry ice/acetone condenser connected to a controlled vacuum system with a graduated cylinder with a ground glass joint attached below the condenser to measure the collected condensate. The reaction was heated in bath containing a metal heating alloy. A steady stream of nitrogen was passed over the reaction mixture for 10 minutes, and then reduced to a slightly positive flow. The reaction mixture was heated at 200° C. for 120 minutes, at which point a clear prepolymer had formed and the expected amount of methanol condensate had been collected. The remaining reagents were added and stirring was resumed. The reaction was ramped to 220° C. over 50 minutes, held at 220° C. for 120 minutes then ramped to 250° C. over 30 minutes. A vacuum was initiated at 200 torr and ramped to 0.5 torr over 20 minutes. After 10 minutes at 0.5 torr, the viscosity had increased to the point where the polyester could no longer be effectively stirred and the reaction was terminated. The molecular weight of the polymer was determined by size exclusion chromatography (SEC) (dimethylformamide, PEO equivalent) to have Mn=4200 and Mw=15,100.

Synthesis of Precursor Polyester 2

TABLE 2

| Reagent # | Reagent | Amount (g) | mole | Mole % in polymer |
|---|---|---|---|---|
| 1 | 5-sulfoisophthalic acid, dimethyl ester, sodium salt. | 47.96 | 0.41 | 50 |
| 2 | 1,4-Cyclohexanedimethanol, mixture of cis/trans. | 119.17 | 0.83 | 100 |
| 3 | Sodium acetate | 1.70 | $2.12 \times 10^{-2}$ | — |
| 4 | Zinc acetate dihydrate | 0.022 | $3.00 \times 10^{-4}$ | — |
| 5 | Fascat 4100 | 0.018 | — | — |
| 6 | Fumaric acid | 47.96 | 0.41 | 50 |

This polyester was prepared in a two stage polycondensation reaction similar to that of Preparative Example 1 using the same apparatus except performed entirely at ambient pressure. Reagents 1–5 were heated at 220° C. and slowly ramped to 250° C. over 460 minutes at which point a clear prepolymer had resulted and the expected amount of methanol had been collected. The reaction was removed from the heating bath and Reagent 6 was added. The reaction was then continued at 220° C. and within 10–15 minutes water condensate began to collect in the trap. The reaction was continued at 220° C. for 400 additional minutes until the polyester became too viscous to stir. The polyester was found to have Mn=2720 and Mw=6400 by size exclusion chromatography in dimethylformamide eluent.

Synthesis of Precursor Polyester 3

Precursor Polyester 3 is a duplicate run Precursor Polyester 2 and was prepared by an analogous procedure at ⅓ scale. The molecular weight was found to be slightly lower (Mn=2520, Mw=8040).

In the following preparative examples, AIBN (2,2'- azobisisobutyronbitrile) was recrystallized once from ether. Styrene and divinylbenzene were passed through a short column of basic alumina to remove inhibitors. Divinylbenzene consists of 80% m, and p divinylbenzene isomers with the remainder being ethylstyrene isomers.

EXAMPLE 1

Synthesis of Particle 1

TABLE 3

| Reagent | Amount (g) |
|---|---|
| 1 | Precursor Polyester 1 | 75.0 |
| 2 | Water | 750.0 |
| 3 | Styrene | 40.0 |
| 4 | Divinylbenzene | 10.0 |
| 5 | n-hexadecane | 5.0 |
| 6 | Toluene | 125.0 |
| 7 | AIBN | 1.25 |

Precursor Polyester 1 was heated in 750.0 ml water at ~60° C. for 1 hour to afford a clear, slightly yellow solution, which was cooled to room temperature. An organic phase was prepared by combining Reagents 3–7. The polyester solution and the organic phase were combined in a 2 L beaker and mixed using a Silverson L4R mixer at the highest speed setting for 10 minutes. The resultant dispersion was poured into a 2 L, 3-neck round bottom flask fitted with a mechanical stirrer, reflux condenser, and nitrogen inlet and bubble degassed with nitrogen for 10 minutes. The reaction was then heated for 16 hours in a thermostatted water bath at 70° C. and the toluene was stripped as a water azeotrope using a rotary evaporator. The particle dispersion was purified by diafiltration with 4 volumes of water using a Millipore Amicon® ultrafiltration system with a 100 K cutoff cartridge. The product dispersion was found to have 14.8% solids. The mean particle size was determined to be 1.35 micrometers using a Horiba LA-90 particle size analyzer. Analysis of the particles by electron microscopy (see FIG. 1) showed heavily wrinkled, spherical particles.

The polyester content of the particles was determined by the following method. 20 ml of methanol was added to 10 ml of the sample and the dispersion was centrifuged at 9000 RPM for 3 hours. The clear supernatant was decanted, the white solids were redispersed in 25 ml methanol, and the procedure was repeated. The resulting solids were dried in a vacuum oven at 80° C. for 16 hours. Combustion analysis of the purified sample gave 0.15% sulfur. This result shows that the particles consist of 6.38% of polyester.

EXAMPLE 2

Synthesis of Particle 2

TABLE 4

| | Reagent | Amount (g) |
| --- | --- | --- |
| 1 | Precursor Polyester 2 | 6.0 |
| 2 | Water | 54.0 |
| 3 | Styrene | 3.2 |
| 4 | divinylbenzene | 0.8 |
| 5 | n-hexadecane | 0.1 |
| 6 | AIBN | 0.1 |

This example demonstrates how bowl-shaped particles can be obtained if the preparation is carried out in the absence of a water-insoluble organic solvent using a precursor polyester which has limited solution compatibility with the monomer mixture.

The preparation and analysis of the particles was carried out in a manner analogous to Example 1 except that the emulsification was carried out using a Silverson Mixer for 5 minutes and the particles were not diafiltered. Particle size analysis showed a broad, bimodal distribution with a mean particle size of 0.403 micrometers. Analysis of the particles by electron microscopy (see FIG. 2) showed bowl-shaped particles.

EXAMPLE 3

Synthesis of Particle 3

TABLE 5

| | Reagent | Amount (g) |
| --- | --- | --- |
| 1 | Precursor Polyester 2 | 6.0 |
| 2 | Water | 123.0 |
| 3 | Styrene | 3.2 |
| 4 | divinylbenzene | 0.8 |
| 5 | n-hexadecane | 0.1 |

TABLE 5-continued

| | Reagent | Amount (g) |
| --- | --- | --- |
| 6 | Toluene | 10.0 |
| 7 | AIBN | 0.1 |

The preparation and analysis of the particles was carried out in a manner analogous to Example 2 except that the organic phase additionally contained toluene. Particle size analysis showed a broad, multimodal distribution with a mean particle size of 0.504 micrometers. Analysis of the particles by electron microscopy (see FIG. 3) showed smaller heavily wrinkled, irregularly shaped particles and larger heavily wrinkled, bowl-shaped particles.

EXAMPLE 4

Synthesis of Particle 4

TABLE 6

| | Reagent | Amount (g) |
| --- | --- | --- |
| 1 | Precursor Polyester 3 | 10.0 |
| 2 | Water | 205.0 |
| 3 | Styrene | 5.3 |
| 4 | divinylbenzene | 1.3 |
| 5 | n-hexadecane | 0.17 |
| 6 | Toluene | 16.6 |
| 7 | AIBN | 0.17 |

The preparation and analysis of the particles was carried out in a manner analogous to Example 1 with the following exceptions. The emulsification was carried out using a Silverson Mixer for 10 minutes followed by sonication using a Vibra Cell probe sonicator (Sonics & Materials Inc.) at the highest power setting for 7 minutes. The dispersion was cooled in an ice bath during sonication to avoid initiation of the polymerization. The toluene was removed by heating the dispersion at 90° C. for 4 hours with nitrogen bubbling. In addition, the particles were not diafiltered. Particle size analysis showed a bimodal distribution with a mean particle size of 0.185 micrometers. Analysis of the particles by electron microscopy (see FIG. 4) showed wrinkled, irregularly shaped particles and wrinkled bowl-shaped particles.

EXAMPLE 5

Synthesis of Particle 5

TABLE 7

| | Reagent | Amount (g) |
| --- | --- | --- |
| 1 | Precursor Polyester 2 | 20.0 |
| 2 | Water | 200.0 |
| 3 | Styrene | 10.7 |
| 4 | divinylbenzene | 2.7 |
| 5 | n-hexadecane | 1.3 |
| 6 | Toluene | 33.3 |
| 7 | AIBN | 0.7 |

This preparation and analysis of the particles was carried out in a manner analogous to Example 1. The product dispersion was found to have 12.9 wt. % solids. The mean particle size was determined to be 1.408. Analysis of the particles by electron microscopy (see FIG. 5) showed heavily wrinkled particles. The particles were found to contain 0.33% sulfur, which corresponds to 6.18% polyester content.

EXAMPLE 6

Synthesis of Particle 6

TABLE 8

| | Reagent | Amount (g) |
|---|---|---|
| 1 | Precursor Polyester 3 | 30.0 |
| 2 | Water | 300.0 |
| 3 | Styrene | 16.0 |
| 4 | divinylbenzene | 4.0 |
| 5 | n-hexadecane | 2.0 |
| 6 | Toluene | 50.0 |
| 7 | AIBN | 1.0 |

This preparation and analysis of the particles was carried out in a manner analogous to Example 5 except that a different emulsification procedure was employed. The combined phases were mixed using a Silverson L4R mixer at the highest speed setting for ~3 minutes, then microfluidized by passage twice through a M-110T Microfluidizer (sold by Microfluidics). The product dispersion was found to have 19.3% solids. The mean particle size was determined to be 0.378 micrometers. The distribution, however, had a secondary mode extending 1 to 10 micrometers which is most likely due to agglomerates, so the actual mean diameter is most likely closer to the value of the statistical mode (0.139 micrometers). Analysis of the particles by electron microscopy (see FIG. 6) showed wrinkled and bowl-shaped articles with diameters of 0.050–0.250 micrometers. The particles were found to contain 1.29% sulfur, which corresponds to 24.16% polyester content.

EXAMPLE 7

Synthesis of Particle 7

TABLE 9

| | Reagent | Amount (g) |
|---|---|---|
| 1 | Fineclad ® 385[1] | 35.0 |
| 2 | Chloromethyl styrene[2] | 17.5 |
| 3 | divinylbenzene | 35.0 |
| 4 | n-hexadecane | 7.0 |
| 5 | AIBN | 0.88 |
| 6 | Toluene | 262.5 |
| 7 | Water | 1050.0 |
| 8 | Dodecanethiol end-capped acrylamide decamer[3] | 14.0 |
| 9 | N,N-dimethylethanolamine | 10.2 g |

[1]Fineclad 385 is an aliphatic unsaturated polyester resin manufactured by Reichhold Inc.
[2]Mixture of 3 and 4 isomers.
[3]The preparation of this surfactant is described in U.S. Pat. No. 6,127,453 (Column 9, lines 36–60).

This example demonstrates the preparation of wrinkled polyester-containing particles comprising an organic-soluble polyester and quaternaly ammonium ionic groups.

An organic phase was prepared by dissolving reagents 1–5 in toluene (6) aqueous phase was prepared by dissolving surfactant 8 in water (7). The combined phases were mixed using a Silverson L4R mixer at the highest speed setting for ~3 minutes, then microfluidized by passage twice through an M-110T Microfluidizer (sold by Microfluidics). The resultant dispersion was poured into a 2 L, 3-neck round bottom flask fitted with a mechanical stirrer, reflux condenser, and nitrogen inlet and bubble degassed with nitrogen for 10 minutes. The reaction was then heated for 16 hours in a thermostatted water bath at 70°, dimethylethanolamine (8) was added, and the reaction was heated for 24 additional hours at 70°. The pH was adjusted to ~9 using 10% $K_2CO_3$, the toluene was then stripped as a water azeotrope using a rotary evaporator and the dispersion was dialyzed overnight using 12–14 K cutoff dialysis tubing. The product dispersion was found to have 20.3% solids. The mean particle size was determined to be 1.52 micrometers. The distribution, however, was bimodal, having modes at ~0.3 and ~2 micrometers. The scanning electron micrograph of the product (see FIG. 7) shows wrinkled and bowl-shaped particles ranging in diameter from ~0.1 to 0.5 micrometers, so it can be assumed that the second (large) mode is due to agglomerates.

EXAMPLE 8

Preparation and Evaluation of an Ink-Receiving Element Comprising Wrinkled Polyester-Containing Particles A coating composition was prepared from 79.0 wt. % of the aqueous dispersion of Particle 5, 1.8 wt. % poly(vinyl alcohol), PVA, (Gohsenol® GH-17 from Nippon Gohsei Co.), and 19.2 wt. % water. [The relative proportions of wrinkled polyester particle to PVA are therefore 85/15 by weight]. The solution was coated onto a base support comprised of a polyethylene resin coated photographic paper stock, which had been previously subjected to corona discharge treatment, using a calibrated coating knife, and dried to remove substantially all solvent components to form the ink receiving layer. The thickness of the dry ink receiving layer was measured to be about 10±2 µm.

The ink-receiving element was printed using a Lexmark Z51 inkjet printer and a cyan inkjet ink, prepared using a standard formulation with a copper phthalocyanine dye (Clariant Direct Turquoise Blue FRL-SF), and a magenta ink, prepared using a standard formulation with Dye 6 from U.S. Pat. No. 6,001,161. The red channel density (cyan) patches and green channel density (magenta) patches at D-max (the highest density setting) were read using an X-Rite® 820 densitometer. The printed elements were then subjected to 4 days exposure to a nitrogen flow containing 5 ppm ozone. The density of each patch was read after the exposure test using an X-Rite ® 820 densitometer. The % dye retention was calculated as the ratio of the density after the exposure test to the density before the exposure test. The ink-receiving element showed 88% retention of the cyan and 99% retention of the magenta.

Preparation of Control Element C-1

The control element for this experiment was a commercially available inkjet porous receiver paper containing a high amount of silica fine particles, "Epson Premium Glossy Photo Paper", Catalogue No. SO41286 from Epson. The control element was printed and subjected to ozone as above.

For both dyes, the control element showed nearly complete fade while the experimental element showed excellent retention.

TABLE 10

Dye fade results.

| | Cyan D-max | % dye retention cyan D-max | Magenta D-max | % dye retention magenta D-max |
|---|---|---|---|---|
| Experimental element (polyester particles) | 1.3 | 88 | 1.5 | 99 |
| Control element | 2.1 | 20 | 2.3 | 3 |

The invention has been described in detail with particular reference to certain preferred embodiments thereof, but it will be understood that variations and modifications can be effected within the spirit and scope of the invention.

What is claimed is:

1. A polymer particle comprising a bead comprising polyester, wherein said bead has a surface with at least one wrinkle.

2. The particle of claim 1 wherein the mean diameter of said bead is less than 10 micrometers.

3. The particle of claim 1 wherein said bead has a mean diameter range between 0.1 and 5 micrometers.

4. The particle of claim 1 wherein said bead is made from an unsaturated precursor polyester.

5. The particle of claim 4 wherein said precursor polyester has a molecular weight of 1,000 to 30,000 gm/mole.

6. The particle of claim 4 wherein said precursor polyester comprises at least one member of the group consisting of maleic, fumaric, itaconic, phenylenediacrylic, citraconic and mesaconic acid.

7. The particle of claim 4 wherein said precursor polyester further comprises sulfonated monomer.

8. The particle of claim 4 wherein said bead is further made from at least one organically soluble monomer.

9. The particle of claim 8 wherein said at least one organically soluble monomer comprises a unifunctional monomer and a polyfunctional monomer.

10. The particle of claim 9 wherein the unifunctional monomer comprises at least 50 weight percent of the total organically soluble monomer.

11. The particle of claim 9 wherein said unifunctional monomer comprises at least one member selected from the group consisting of styrenics, acrylate esters, and methacrylic acid esters.

12. The particle of claim 9 wherein said polyfunctional monomer comprises at least one member selected from the group consisting of divinylbenzene isomers, ethylene glycol divinyl ether, divinyl adipate, cyclohexanedimethanol divinyl ether, and ethylene glycol dimethacrylate.

13. The particle of claim 1 wherein said bead has an ionic group equivalent weight of between 1000 and 500,000 grams of particle per mole of ionic unit.

14. The particle of claim 1 wherein said bead is dry.

15. The particle of claim 1 wherein said bead is in an aqueous dispersion.

16. The particle of claim 1 wherein said bead is surfactant stabilized.

17. The particle of claim 1 wherein said bead is stabilized by a colloidal inorganic.

18. The particle of claim 1 wherein said bead is stabilized by a protective colloid.

19. The particle of claim 1 wherein said bead is essentially spherical in shape.

20. The particle of claim 1 wherein said bead is bowl shaped.

21. A method of forming wrinkled polyester-containing particles comprising:
preparing a mixture of an organic phase and an aqueous phase, said mixture comprising an unsaturated precursor polyester, a water immiscible organic solvent, at least one organic-soluble ethylenically unsaturated monomer, and initiator;
subjecting said mixture to high energy emulsification;
initiating crosslinking of said polyester after emulsification; and
removing said water immiscible organic solvent to recover wrinkled polyester-containing particles.

22. The method of claim 21 wherein said crosslinking is initiated by heating.

23. The method of claim 22 wherein said heating is at a temperature of between 30 and 100° C.

24. The method of claim 22 wherein said heating is for a period of between 0.5 and 16 hours.

25. The method of claim 21 wherein prior to preparing said mixture, said precursor polyester is in said aqueous phase.

26. The method of claim 21 wherein prior to preparing said mixture, said precursor polyester is in said organic phase.

27. The method of claim 21 wherein said mixture further comprises an emulsifier.

28. The method of claim 27 wherein said emulsifier is selected from the group consisting of hydrophobe-end capped oligoacrylamides, sulfosuccinate esters and their salts, tetraalkylammonium salts, alkylphenol ethoxylates, PEO-PPO block copolymers, poly(vinyl alcohol), poly(vinyl pyrrolidone), salts of long chain alkylsulfonates, sulfonated alkylated diphenyl ethers, naphthalenesulfonate salts, alkylbenzenesulfonate salts, and colloidal silica.

29. The method of claim 21 wherein said mixture further comprises an emulsifier in said aqueous phase.

30. The method of claim 21 wherein said initiating of crosslinking is by redox initiation.

31. The method of claim 21 wherein said removing of said organic solvent is by pouring the mixture after crosslinking into a water miscible organic solvent and recovering said particles by filtration or sedimentation.

32. The method of claim 21 wherein said particles after removal of said water immiscible organic solvent are freeze dried.

33. The method of claim 21 wherein said mixture further comprises a cosurfactant stabilizer.

34. The method of claim 21 wherein said mixture further comprises colloidal inorganic particles.

35. The method of claim 21 wherein said precursor polyester comprises at least member selected from the group consisting of maleic, fumaric, itaconic, phenylenediacrylic acid, citraconic and mesaconic.

36. The method of claim 21 wherein said precursor polyester further comprises a sulfonated monomer.

37. The method of claim 21 wherein said precursor polyester has an average (Mn) molecular weight of 1,000 to 30,000 gm/mole.

38. The method of claim 21 wherein said at least one organic soluble ethylenically unsaturated monomer comprises at least one member selected from the group consisting of styrene, alkylstyrenes, divinylbenzene, ethylene glycol dimethacrylate, ethylene glycol divinyl ether, divinyl adipate, cyclohexanedimethanol divinyl ether, and methacrylate esters.

39. The method of claim 21 wherein said initiator is selected from the group consisting of azo compounds, organoperoxides, organohydroperoxides, persulfate salts, and redox initiators.

40. The method of claim 21 wherein said water immiscible organic solvent is at least one member selected from the group consisting of benzene, toluene, xylene isomers, acetate esters, isopropyl ether, butyl ether, chloroform, carbon tetrachioride, and 1,2-dichloroethane.

41. The method of claim 21 wherein said precursor polyester and said at least one organic-soluble ethylenically unsaturated monomer are present in a weight ratio of 1:99 to 10:1.

42. The method of claim 21 wherein said precursor polyester comprises at least 20 mole percent unsaturated diacid units based on total diacid units.

43. The method of claim 21 wherein said precursor polyester has an ionic group equivalent molecular weight of between 600 and 6000 grams of polymer per mole of ionic unit.

44. The method of claim 21 wherein said at least one organically soluble monomer comprises at least one unifunctional monomer and at least one polyfunctional monomer.

45. The method of claim 44 wherein said unifunctional monomer comprises at least 50 weight percent of the total organically soluble monomer.

46. The method of claim 44 wherein said unifunctional monomer comprises at least one member selected from the group consisting of styrenics, and methacrylic acid esters.

47. The method of claim 44 wherein said polyfunction monomer comprises at least one member selected from the group consisting of divinylbenzene, ethylene glycol dimethacrylate, ethylene glycol divinyl ether, divinyl adipate, and cyclohexanedimethanol divinyl ether.

48. A method of forming bowl-shaped wrinkled polyester-containing particles comprising:
    preparing a mixture of an organic phase and an aqueous phase, said mixture comprising an unsaturated precursor polyester, at least one organic-soluble ethylenically unsaturated monomer, and initiator;
    subjecting said mixture to high energy emulsification;
    initiating crosslinking of said polyester after emulsification; and
    removing said water immiscible organic solvent to recover wrinkled polyester-containing particles.

* * * * *